Feb. 8, 1966  AKIRA OKAYA  3,234,390
COMMUNICATION WITH LIGHT CONTRAST MODULATION
Filed Jan. 12, 1962
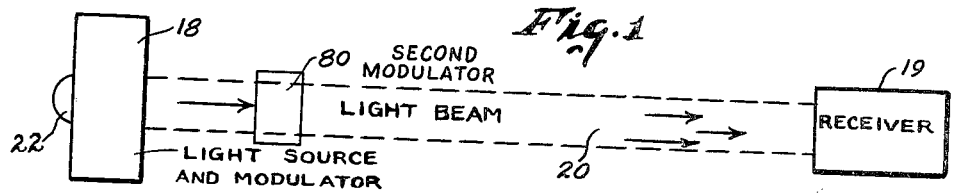
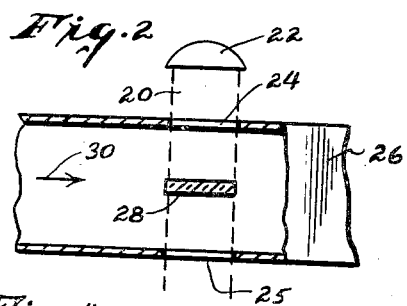
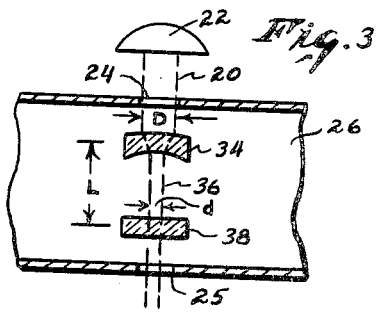
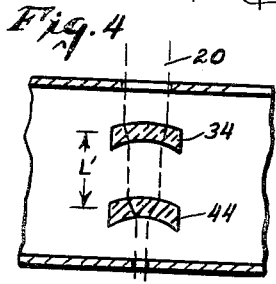
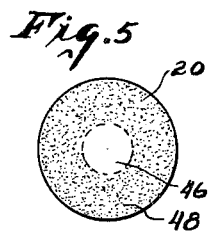
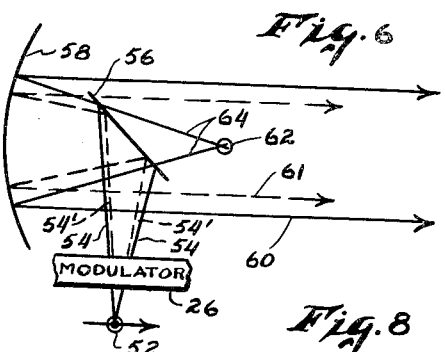
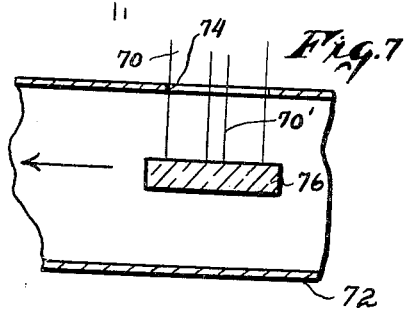
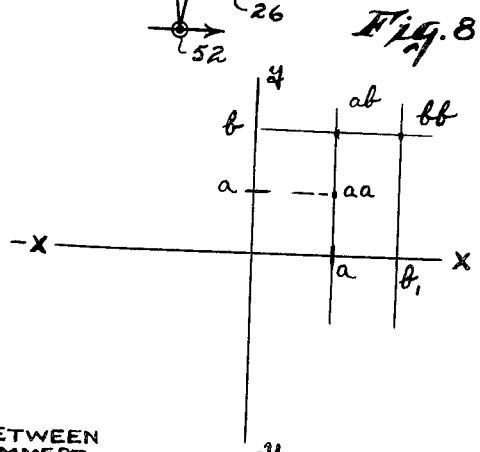
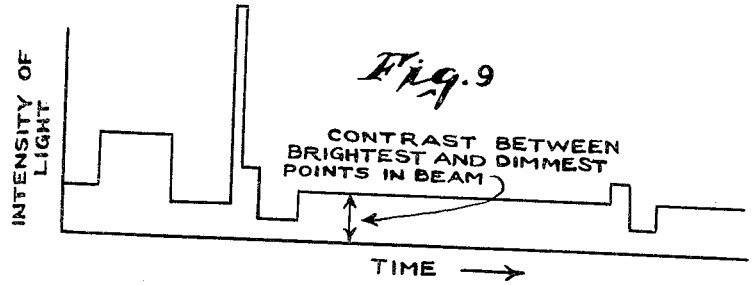
INVENTOR.
Akira O'Kaya
BY Emery Whittemore
Sandoe & Graham
ATTORNEYS 3,234,390
COMMUNICATION WITH LIGHT CONTRAST
MODULATION
Akira Okaya, % J. D. Herrebaudt, Lackview Road,
Ossining, N.Y.
Filed Jan. 12, 1962, Ser. No. 165,921
16 Claims. (Cl. 250—199)

This invention relates to the modulation of light beams and to the use of such modulation for communication, such as message transmission. More particularly, the invention relates to contrast modulations in which the distribution of the light is changed transversely of the beam by modulating frequencies. This is a different principle of modulation from amplitude modulation which necessarily varies the amplitude of the beam; and frequency modulation which necessarily varies the frequency and which together with amplitude modulation, is subject to energy density variations of the light beam at certain times and positions. Such variations may also be caused by atmospheric conditions or by temporary or swinging obstructions in the path of the beam.

It is an object of this invention to modulate a light beam by contrast modulation so that messages can be communicated by the light beam without changing the energy of the beam and with minimum variation in the signal if there is a variation in the energy of the signal due to disturbances outside, as received.

A light beam may be of equal intensity across its full cross section or it may be of greater or lesser intensity at localized areas of its cross section without changing the total energy of the beam. When the intensity of the beam is varied so as to shift the light intensity between different localized areas of the cross section of the beam, the modulation using this idea can be designated as "contrast modulation," though the integration of the light over the different areas of the cross section may maintain a total energy of the beam that remains constant. This contrast modulation, when varied radially about a longitudinal axis of the beam, may be designated as "polar contrast modulation."

Contrast modulation can be obtained in its simplest form by merely varying the diameter of the light beam without changing the energy of the beam, considering the maximum diameter as that of the normal beam, then the reductions in diameter represent a concentration of light at the center of the beam and across a section which is dependent upon the extent of the diameter reduction.

Although one of the advantages of contrast modulation is that the energy of the light beam need not be changed, the contrast of the beam can be varied even though the energy of the beam is varied also. It is, therefore, possible to send a message by amplitude modulation of a light beam and to send another message at the same time by contrast modulation of the same beam. Still another message can be sent simultaneously by frequency modulation of the beam.

An outstanding advantage of contrast modulation is that a receiver can be made responsive to the ratio of the energy intensity or light density at two localized areas of the beam, and this ratio may remain substantially constant in spite of partial obstruction of the beam by fog or smoke or other atmospheric conditions, or by passage of people, vehicles or other obstructions into the path of the beam.

Another object of this invention is to contrast modulate two polarized lights of which polarizations are perpendicular to each other in the transverse plane, and then any point on the plane which has $x, y$ coordinates of contrast modulation amplitude can be sent without changing frequency and amplitude of the light waves.

An outstanding feature of this contrast modulation using two polarized lights is to send very complicated curves or functions on/of $x-y$ plane, which will not be, or are difficult to be, expanded by Fourier series. This is due to the non-frequency and non-amplitude dependence feature of the contrast modulation. Thus the extremely complicated messages can be sent by contrast modulation without producing any side band waves.

The term "light" is used herein to designate light of the visible spectrum, and also infra-red and ultra-violet light. Another object of the invention is to transmit signals by contrast modulation of a light beam as it passes through a contrast modulator on its way to detection or receiving apparatus.

Other objects, features and advantages of the invention will appear or be pointed out as the description proceeds.

In the drawing, forming a part hereof, in which like reference characters indicate corresponding parts in all the views;

FIGURE 1 is a diagrammatic view showing apparatus for communication by light beams in accordance with this invention;

FIGURE 2 is a diagram illustrating apparatus for frequency modulation;

FIGURE 3 is an illustration showing simple apparatus for contrast modulation with a compensator for eliminating frequency modulation components;

FIGURE 4 shows a modified construction of the apparatus for obtaining contrast modulation;

FIGURE 5 is a diagrammatic view showing the cross section of a light beam having contrast modulation;

FIGURE 6 shows another modification of apparatus for obtaining contrast modulation with different variations in light intensity over different areas of the cross section of the beam;

FIGURE 7 is a diagram showing a receiver for messages transmitted by contrast modulated light;

FIGURE 8 is a diagram showing one way in which the invention can be used for transmitting information;

FIGURE 9 is a diagram showing the changes in intensity of light at a given point of a receiver as the result of contrast modulation.

FIGURE 1 shows a light source and contrast modulator 18 which projects to a receiver 19, a light beam 20. The receiver 19 is responsive to the contrast modulations of the light beam 20 and receives whatever signals are imposed on the light beam in the contrast modulator 18.

The energy E of the whole light beam, passing through the observing point, per unit time, is $$E = nh\nu$$

where $n$ is the number of photons which radiate per unit time,
$h$ is Plank's constant,
$\nu$ is the frequency of the carrier light wave.

It will be evident that any change in the distribution of the photons over the cross section of the beam does not change the total energy; but merely the contrast between the light intensity between points at different locations transverse of the direction of transmission of the beam.

Contrast modulation can be used to send complicated messages in any optical carrier frequency without producing any side band. For example, the signal can be like a step function as shown in FIGURE 9. It is not necessary that the signal be a periodic function; it can be any kind of function. It is not necessary that it be either a function which can be expanded by Fourier's series or a function which does not converge in some expansion series. The reason is that contrast modulation, which is neither frequency nor amplitude modulation, can be done independent of the time variation factor.

In FIGURE 2, the light beam 20 from a source 22 is projected through aligned optical openings 24 and 25 in the walls on opposite sides of a wave guide 26. The light beam 20 is preferably parallel, and it passes through a di-electric plate 28 made of material which is transparent to energy of the wave length of the light beam 20.

The plate 28 is made of material which resenates with dielectric resonance in response to microwaves 30 or other radiant energy transmitted through the wave guide 26.

As the light passes through the plate 28, it undergoes a phase shift $\varphi$ (0) when there is no microwave power input to the resonator or plate 28.

When there is microwave power in the wave guide 26 which produces dielectric resonance of the resonator or plate 28, then there is a phase shift of the light passing through the plate 28. This phase of light is shifted in the resonator from $\varphi(0)$ to $\varphi(E)$ This phase shift may be expressed by the equation:

$$\varphi(E) = \varphi(0) + aE + bE^2$$

Here $$E = e \sin \omega_m t$$

where $\omega_m$ is a microwave angular frequency of modulator and,
$e$ is an amplitude of modulation.

Because the refractive index (or di-electric constant) is changed by microwave power input, the equation for the light beam can be written as follows:

$$\psi(E) = +\psi_0 e^{i[\omega_0 t + \varphi(E)]}$$

where $\omega_0$ is optical angular frequency and,
$\psi$ is light wave amplitude.

The phase shift $\varphi(E)$ corresponds to the change of refractive index and therefor the change of effective thickness of the di-electric lenses 28, 34, 38, 34 and 44, which produce the contrast modulations as shown in FIGURES 2, 3 and 4. However the modulation above described produces frequency modulations components at the same time, and hence this frequency modulations must be compensated in order to have pure contrast modulation.

FIGURE 3 shows apparatus for obtaining contrast modulation in its simplest form. The light beam 20 from the light source 22 is projected through the optical openings 24 and 25 at the wave guide 26. A lens 34 is located in the path of the light beam 20, and this lens 34 refracts the light beam to produce a narrower portion 36 of the light beam. This refraction reduces the light beam from a diameter D to a diameter d. This reduction in diameter produces a corresponding increase in the density of the light. By varying the supply of microwave to the wave guide 26, the index of refraction of the lens 34 is changed and this changes the diameter d. However, for reasons which have already been explained in connection with FIGURE 2, the changes in refraction of the lens 34 produce frequency modulations. In order to have a pure contrast modulation, therefore, it is necessary to compensate the frequency modulation which is produced by the lens 34. This may be done by inserting a resonator plate 38 in the path of the portion 36 of the light beam.

The lens 34 and the plate 38 are both transparent to light of the wave length supplied by the source 22 and they are made of material and size to resonate at the same microwave frequency.

This resonator plate 38 has front and back surfaces which are preferably parallel; and the distance L between the lens 34 and the resonator plate 38 is adjusted so that these two resonators are excited by opposite microwave phase. When in this relation, the resonator plate 38 compensates the frequency modulation component of the lens 34 and the portion 36 of the light beam beyond the resonator plate 38 has pure contrast modulation.

FIGURE 4 shows a different combination of resonators through which the light beam 20 passes. The first resonator is the lens 34, but instead of the resonator plate, with parallel faces, the portion of the light beam beyond the lens 34 passes through another lens 44, in which the diameter is still further reduced and the frequency modulation will be cancelled out. The lenses 34 and 44 are spaced from one another by the distance L' to compensate the frequency modulation component. This can be done using the quadratic term of $\varphi(E)$ equation.

FIGURE 5 shows the light beam 20 with a brightly lighted center area 46 surrounded by an angular, darker area 48. With the maximum of contrast modulation, the area 46 will have a high light density and the area 48 will have no light. It is preferable, however, to have the area 48 illuminated to some extent. The reason for this is that the receiver can be responsive to the ratio of light density in the area 46 to that of the light density in the area 48. This ratio may remain substantially constant even though there are fluctuations in the energy of the beam or partial obscuration of the beam, as for example, by passage of smoke across the beam or development of fog at some location along the beam. In the event of such partial interference with the light, the effect on the bright area 46 and the less bright area 48 may affect these areas in such a way that the ratio of their lumination is not substantially changed. If there is no light on the area 48 then the ratio will necessarily change because one of the quantities of the ratio will be zero and this will not be subject to change.

FIGURE 6 is a diagrammatic showing of apparatus by which the light intensity at the center of the beam can be changed while maintaining illumination across the entire beam and with the energy of the beam remaining substantially constant. Light from a light source 52 passes through a wave guide 26 in which the light beam may be modulated by contrast modulation in the manner explained in FIGURE 3. The light beam from the source 52, when there is no modulating energy supplied to the wave guide 26, is indicated by the solid lines 54. When energy is supplied to the wave guide 26 of the modulator the light beam is made narrower as indicated by the dotted lines 54 prime. The light beam is reflected by a partial reflecting, partial transmitting mirror 56 to a reflector 58 which transmits a parallel light beam 60. This light beam may be reduced in cross section as indicated by the dotted lines 61.

A second light source 62 supplies a light beam indicated by the lines 64. A portion of this light beam passes through the mirror 56 and is reflected back from the reflector 58 to form another part of the light beam 60. Thus, the light beams from the sources 52 and 62 combine to form a single light beam 60.

When the light from the source 52 is reduced in cross section as indicated by the dotted lines 61 prime then the light beam 60 is merely changed by contrast modulation so as to have a higher density of light at its mid portion than at its outer portions, but the energy of the light beam is not changed. The partially reflecting, partially transmitting mirror 56 causes some loss of light and in the simple construction illustrated in FIGURE 6 no attempt is made to utilize the light from the source 52 which is not reflected by the mirror 56, or the portion of the light from the light source 62 which is reflected. The illustration is kept as simple as possible for a clearer understanding of the invention.

It will be understood that the light from the light source 62 can be modulated also if desired; and although the light source 62 is shown located within the beam 60 it will ordinarily not be so located if the light from this source is to pass through a modulator. Various combinations can be made using reflectors and locating light sources at different locations to suit the reflectors.

The light from the sources 52 and 62 can be polarized and in one embodiment of the invention two sources of light are used with the light from each source polarized in a plane which is perpendicular to the light propagation direction and with the beams polarized in directions perpendicular to each other.

By combining light of perpendicular polarizations in a single light beam, some interesting results can be obtained at the receiver. The receiver can be made with separate circuits sensitive to the different polarizations, this merely requiring separation of the different polarized light by reflectors to the receiving screens of the different polarization circuits.

If the light intensity at a particular location of the receiver has a value $a$ for the light which is polarized along the $x$ axis and light which is polarized along the $y$ axis has an intensity $b$, then the combined effect at the receiver circuits can be used to designate a point $a, b$ as indicated in FIGURE 8 of the drawing. If the intensity of contrast modulation of the light polarized along the $y$ axis is reduced to a value equal to that of the light polarized along the $x$ axis, the point $a, a$ will be designated. Similarly, if the light intensity of contrast modulation of both beams are equal to the value $b$ then the point $b, b$ will be indicated. Thus, by using two polarized light beams it is possible to send any complicated line on $x, y$ plane (or function of $x$ and $y$) without changing total intensity of the light $n$, and frequency $\nu$ as indicated in FIGURE 8.

FIGURE 7 shows a demodulator or receiver for the contrast modulated light beam. In this figure the beam is indicated by the reference character 70 and a central high intensity portion of the beam is indicated by the reference character 70 prime. The light beam enters a wave guide 72 through an optical opening 74. There is a plate 76 located in the wave guide 72 and in the path of the light beam 70. This plate 76 has a top surface at least as large as the full diameter of the light beam 70. The plate 76 is made of di-electric material which is subject to shape resonance when exposed to microwaves passing through the wave guide 72.

The resonance of the plate 76 changes the amplitude of the microwaves in the wave guide 72. Changes in the intensity or density of the light beam 70 striking the plate 76 changes the resonance of the plate 76 and changes the amplitude of the microwaves one way or the other depending upon the mode of the resonator plate 76.

The resonators used for the original modulation of the light beam and for the plate 76 in the receiver shown in FIGURE 7 may be made of various materials as described in my co-pending patent application, Ser. No. 3,872, filed Jan. 21, 1961. Certain crystals at non-linear characteristics in optical frequency, can be used for the plate 76. Suitable materials are balium titanate; strontium titanate; ammonium dihydrate phosphate; potassium dihydrate phosphate; and trigricine sulfate. If the material used for the resonator plate 76 has linear characteristics, it must be coated with some photo-electric, optically non-linear materials, such as PbS and SbCs$_3$.

With polarized light, the energy of the beam may be expressed by the equation:

$$E = nh\nu = n_x h\nu + n_y h\nu = A_x(t) + A_y(t) = \text{constant}$$

where $A_x(t)$ is the light intensity of the part of the beam polarized in the direction of the $x$ axis, $A_y(t)$ is the light intensity of the part of the beam polarized in the direction of the $y$ axis.

The propagation of the light is in the direction of the $z$ axis.

Furthermore $A_x$ and $A_y$ can each be made constant if more freedom of operation is needed, and each can be modulated separately; the differently polarized polar contrast modulation components being expressed as follows in the case of $$A_x = \int_0^\gamma A_x(\gamma t)\, d\gamma = \text{constant}$$

$$A_y = \int_0^\gamma A_y(\gamma t)\, d\gamma = \text{constant}$$

The function of $A_x(\gamma t)$ and $A_y(\gamma t)$ can be any kind of function as far as they satisfy the above conditions. By contrast modulation of the quantities $A_x$ and $A_y$, and point in the $x$–$y$ plane can be sent from transmitter to receiver as already illustrated in FIGURE 8.

Where the same light beam is modulated in amplitude, frequency and contrast, the energy may be expressed by the equation:

$$E_{am;fm;cm} = B(t)(A_x + A_y) e^{i(\omega t + \varphi t)}$$

In this case $nh\nu$, $\omega$ and $\varphi$ are no longer constant and there are variations of $\Delta n(t)$ and $\Delta \varphi(t)$.

One can separate these three modulations with no interference. AM and FM are the modulations along the $z$ axis, so the modulation combining CM, AM, and FM may be designated a "three dimensional modulation."

A second modulator 80 (FIGURE 1) in the path of the contrast-modulated beam 20 imposes an AM or FM modulation on this same beam 20. Apparatus for putting such modulations on a light beam are described in my patent application, Serial No. 145,724, filed Oct. 17, 1961, for Light Modulation by Micro Waves.

While the light beams considered in this description have been beams of circular cross section, it will be understood that they may be of any desired cross section, depending upon the shapes of the light projector and the apparatus for receiving the light.

The preferred embodiments of the invention have been illustrated diagrammatically and described, but changes and modifications can be made and some features can be used in different combinations without departing from the invention as defined in the claims.

What is claimed is:

1. Apparatus for modulating a light beam including a lens for changing the light intensity by change in the cross section of the beam, and a compensator in line with the lens in the path of the light for compensating any changes produced by the lens in the frequency of the light, and means for changing the refraction of the lens.

2. The apparatus described in claim 1, and in which the lens is located in a wave guide and made of material which changes its index of refraction in response to dielectric resonance produced therein by electromagnetic waves in the wave guide.

3. The apparatus described in claim 2 and in which the compensator is an element transparent to the light beam and having dielectric resonance at the same frequency of electromagnetic waves the causes the dielectric resonance of the lens.

4. The apparatus described in claim 3 and in which the lens and the compensator are both made of a material and of a size having dielectric resonance in response to the same electro-magnetic wave frequency.

5. Apparatus for modulating a light beam including a source of light, means for modulating changes of contrast of the illumination between different parts of the transverse section of the beam, and a light-responsive receiver having different parts in the path of the light, said different parts being in positions to receive light from different portions of the contrast-modulated beam across said transverse cross section.

6. The apparatus described in claim 5 and in which the source of light produces a beam of circular cross section, and the means for modulating changes of contrast of the illumination between different parts of the transverse section of the beam vary the light radially to produce annular zones of unequal intensity.

7. The apparatus described in claim 5 and in which the means for modulating changes of contrast of the illumination between different parts of the transverse section of the beam include a refractive element for changing the distribution transversely of the beam.

8. The apparatus described in claim 5 and in which said means for modulating changes of contrast of the illumination between different parts of the transverse section of the beam include a reflector element.

9. The apparatus described in claim 5 and in which the source of light supplies superimposed light beams, and the means for modulating changes of contrast of the illumination between different parts of the transverse section of the beam are across at least one of the beams there are means for producing changes in the distribution light intensity across at least one of the beams.

10. The method of communication by means of light beams which comprises projecting a light beam from a source, modulating the light beam by varying its relative intensity, at different locations across the transverse cross section of the beam compensating any changes in frequency resulting from said modulation, and projecting the modulated light beam to a receiver.

11. The method described in claim 10 and characterized by passing the light beam through a refractor and modulating the light beam by changes in the index of refraction of the refractor.

12. The method of communication described in claim 10 characterized by imposing on the modulated light beam a second form of modulation.

13. The method of communication by means of light beams which comprises projecting a light beam from a source, modulating the contrast of different parts of the transverse cross section of the light beam in accordance with signals to be communicated, and projecting the modulated light beam on a receiver that is responsive to local variations in the intensity of said light beam.

14. The method described in claim 13, characterized by maintaining the energy of the light beam substantially constant and modulating the beam by transferring energy from one part of the beam to another transversely thereof.

15. The method of communication by means of light beams which comprises projecting a light beam from a source, modulating the light beam by varying the intensity of the light locally at different portions of its transverse cross section and in accordance with signals to be communicated, and projecting the modulated light beam on a receiver that is responsive to local variations in the intensity of said light beam, which method in characterized by projecting the light beam from a plurality of sources, and varying the pattern of light from the different sources so as to combine the light from said different sources in different ways at portions of the cross section of the beam at various stations along the length of the beam.

16. The method described in claim 15 characterized by narrowing the cross section of the portion of the light from one source within the beam to increase the intensity of the light over the cross section in which said portion of the beam is narrowed.

References Cited by the Examiner
UNITED STATES PATENTS

| | | | |
|---|---|---|---|
| 2,265,784 | 12/1941 | Von Bayer | 250—199 |
| 2,451,732 | 10/1948 | Hershberger | 88—61 |
| 2,667,811 | 2/1954 | Osterberg | 88—61 |
| 2,707,749 | 5/1955 | Mueller | 250—199 |
| 2,974,568 | 3/1961 | Dillon | 250—199 |
| 3,126,485 | 3/1964 | Ashkin et al. | 250—199 |

DAVID G. REDINBAUGH, *Primary Examiner.*